US007193834B2

(12) United States Patent
Oh et al.

(10) Patent No.: US 7,193,834 B2

(45) Date of Patent: Mar. 20, 2007

(54) STATIC CHARGE-IMMUNE ENCLOSURE

(75) Inventors: Hieyoung W. Oh, Bowdoin, ME (US); Daniel P. McCormick, Turner, ME (US)

(73) Assignee: Illinois Tool Works Inc, Glenview, IL (US)

( * ) Notice: Subject to any disclaimer, the term of this patent is extended or adjusted under 35 U.S.C. 154(b) by 653 days.

(21) Appl. No.: 10/667,985

(22) Filed: Sep. 22, 2003

(65) Prior Publication Data

US 2004/0174662 A1 Sep. 9, 2004

Related U.S. Application Data

(60) Provisional application No. 60/440,791, filed on Jan. 17, 2003.

(51) Int. Cl.
*H02H 1/00* (2006.01)

(52) U.S. Cl. ...................................................... 361/212

(58) Field of Classification Search ................. 361/212
See application file for complete search history.

(56) References Cited

U.S. PATENT DOCUMENTS

| | | | | |
|---|---|---|---|---|
| 3,117,333 | A | 1/1964 | Murray et al. | |
| 6,231,356 | B1 | 5/2001 | Stutts et al. | 439/92 |
| 6,647,242 | B2 * | 11/2003 | Gagnon et al. | 399/390 |
| 6,952,555 | B2 * | 10/2005 | Oh et al. | 399/390 |
| 7,036,814 | B2 * | 5/2006 | Oh et al. | 271/121 |

FOREIGN PATENT DOCUMENTS

| | | |
|---|---|---|
| GB | 2 028 596 A | 3/1980 |
| GB | 2 149 220 A | 6/1985 |

* cited by examiner

*Primary Examiner*—Stephen W. Jackson
(74) *Attorney, Agent, or Firm*—Mark W. Croll; Paul F. Donovan

(57) ABSTRACT

A static charge dissipater for a card slot of an electronic device includes a plurality of filaments on a conductive strip, with tips of the filaments disposed along the slot to induce ionization in the presence of the electrical field of a statically charged card inserted into the slot.

20 Claims, 2 Drawing Sheets

STATIC CHARGE-IMMUNE ENCLOSURE

CROSS REFERENCE TO RELATED APPLICATIONS

The present regular U.S. Patent Application claims the benefits of U.S. Provisional Application 60/440,791, filed on Jan. 17, 2003.

FIELD OF THE INVENTION

The present invention relates generally to interface devices such as card slots on electronic equipment and to static control devices; and, more particularly, the present invention relates to static control devices utilizing fine fiber bundles and non-contact ionization for static charge dissipation.

BACKGROUND OF THE INVENTION

Increasing numbers of electronic devices are becoming portable and wireless. Handheld and laptop equipment is becoming more versatile, and remotely connectable to wireless networks, the Internet and other information systems. As the equipment becomes more versatile, greater and greater masses of information are stored for subsequent retrieval. Some components and capabilities are hardwired into the units. It is also common that interface slots are provided to receive various PCMCIA cards and other equipment, as well as a variety of other data storage units that can be removed from and attached to a laptop computer or other portable device, as needed. As the versatility and adaptability of electronic devices has increased, problems associated with static charges pose an increasing threat to the reliability of the electronic equipment.

Because of increased human handling of the replaceable components, such as pc cards, it is inevitable that electrostatic discharge takes place from time to time between the person and the device. Electrostatic charges on an individual can be as high as several thousand volts, and are known to be discharged to objects and things such as electronic equipment when the person touches the equipment.

For example, a PCMCIA card frame is manufactured from conductive metal, normally stainless steel, and the receiving frame or the enclosure which will receive the PCMCIA card is also made of conductive metal that is attached to the equipment ground. Many PCMCIA cards have multiple contact points on an external surface to provide more contact with the receiving frame to discharge static charges on the PCMCIA card. However, the high charge on a PCMCIA card can cause a spark on the receiving frame or enclosure, if the static charge is high enough to break air molecules. In such situations, it is not uncommon that the high charge does not go to the receiving frame, but instead travels to any sharp point in the equipment, if the point is a least-resistance path for the charge. Such transit charges can damage delicate electronic equipment components, or can reset whole units. Simple grounding of the enclosure does not prevent the damage or nuisance frequently caused by transit charges.

What is needed in the art is an enclosure for PCMCIA cards and other data storage devices which eliminates or minimizes electrostatic discharge problems associated therewith.

SUMMARY OF THE INVENTION

The present invention solves the above and other problems by providing a static charge immune enclosure with safe static charge dissipation without creating an electrical spark when a PCMCIA card or other data storage device touches the enclosure. The static charge immune enclosure includes bristle—style filament electrodes that are attached on the surface of the enclosure and are connected or inserted into an insulating substrate that accepts charges rapidly and depletes the charges slowly into the surrounding environment or to a ground point within the device.

In one aspect thereof, the present invention provides an electronic interface component with a slot configured for receiving a second interface component therein. The slot includes at least one perimeter member and a static charge dissipater attached to the perimeter member. The dissipater includes a conductive carrier strip and, a plurality of electrically conductive filaments electrically connected to the conductive carrier strip. The filaments have distal tips in spaced relation to the conductive carrier strip. An adhesive connects the strip and the filaments to the perimeter member. The dissipater is positioned on the perimeter member with the filament distal tips in substantially uniform position relative to a second interface component inserted into the slot.

In another aspect thereof, the present invention provides a static charge dissipating assembly for an electronic component card slot with at least one perimeter member defining the card slot for receiving a card inserted therein in an insertion direction. A static control device on the perimeter member includes a conductive plastic carrier strip, the carrier strip having a length and first and second lateral edges. The carrier strip is disposed transverse to the insertion direction. A plurality of electrically conductive filaments are attached to the carrier strip, disposed on the strip transverse to the lateral edges, and extending beyond at least one of the lateral edges. The filaments have diameters sufficiently small to induce ionization in the presence of an electrical field, and have distal ends remote from the carrier strip disposed in the slot.

In still another aspect thereof, the present invention provides a method for dissipating static charge on a card inserted into a card slot of an electronic device. The method has steps of providing a path for inserting the card in to the slot, and an arrangement of filaments having diameters sufficiently small to induce ionization in the presence of an electrical field; positioning distal ends of the filaments in the path; passing the card along the path adjacent the distal tips of the filaments; and inducing ionization from the static electric charge on the card passing along the filament tips.

An advantage of the present invention is providing a simple, yet effective static control device that operates in the close environments for PCMCIA card slots and other data storage devices.

Another advantage of the present invention is providing a static charge control device that is easy to install properly and is resistant to corrosion and damage.

Still another advantage of the present invention is providing a static control device that is robust, lightweight and will withstand repeated use from the insertion and removal of PCMCIA cards or other data storage devices.

Other features and advantages of the invention will become apparent to those skilled in the art upon review of the following detailed description, claims and drawings in which like numerals are used to designate like features.

Figure 1:
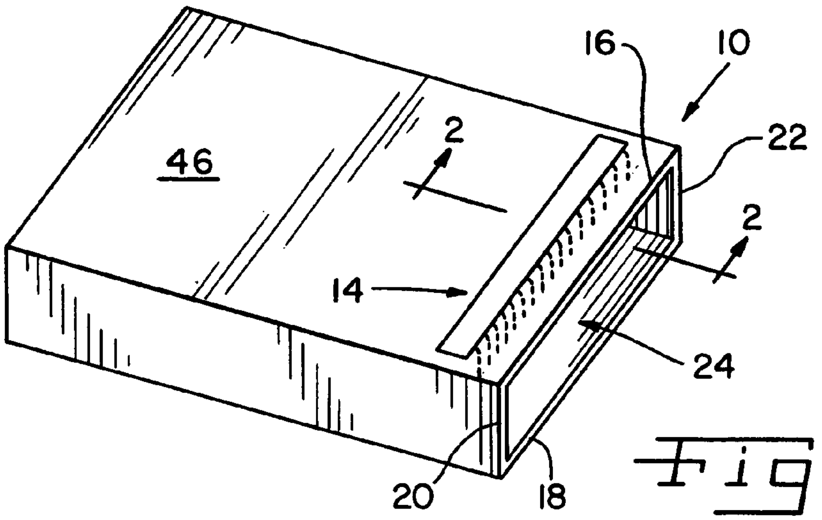
FIG. 1 is a perspective view of a static charge-immune enclosure in accordance with the present invention.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of "including" and "comprising" and variations thereof is meant to encompass the items listed thereafter and equivalents thereof, as well as additional items and equivalents thereof.

DETAILED DESCRIPTION OF THE PREFERRED EMBODIMENT

Referring now more specifically to the drawings, and to FIG. 1 in particular, numeral 10 designates a static charge-immune enclosure in accordance with the present invention. Enclosure 10 is a receiving unit of an interface 12 (FIG. 2) for a computer or the like, and includes a passive static charge dissipater 14 in accordance with the present invention. It should be understood that enclosure 10 can be of a variety of configurations, such as a pc card slot of a laptop or other computer, a peripheral memory slot of a handheld device or the like.

Figure 2:
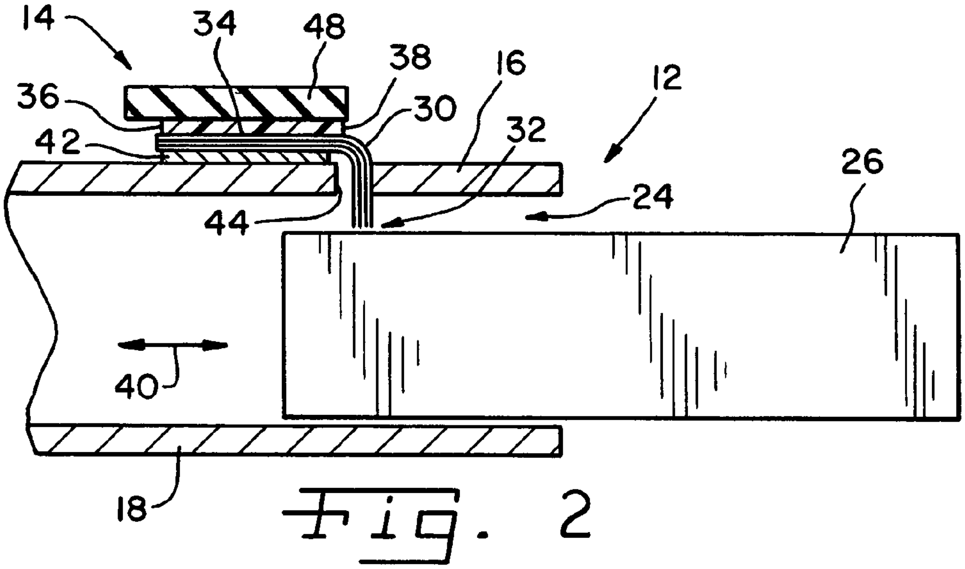
FIG. 2 is a cross sectional view of the enclosure shown in FIG. 1, taken on line 2—2 of FIG. 1.

Enclosure 10 includes a plurality of perimeter members, such as a top 16, a bottom 18 and sides 20 and 22 defining therebetween a slot 24 for receiving therein a PCMCIA card or other card/memory device 26 (FIG. 2). Within slot 24 enclosure 10 includes various connectors (not shown) for mating with complementary connectors (not shown) on card/memory device 26. The manner in which a PCMCIA card or other card or memory device 26 functionally connects in a slot 24 defined by enclosure 10 is well known to those skilled in the art and will not be described in further detail herein.

Dissipater 14 provides a path to ground for static charge accumulated on card/memory device 26. Dissipater 14 includes a plurality of fiber filaments 30 that may be arranged individually or in bundles. Each filament 30 is a fine, hair-like structure and can be made from carbon fiber, stainless steel fiber, conductive acrylic fiber or any other conductive fiber-type filament that can be provided with diameters sufficiently small to induce ionization when in the presence of an electrical field.

Filaments 30 include distal tips 32 and are arranged on a conductive carrier strip 34 such that distal tips 32 are in uniform spaced relation to strip 34. Strip 34 preferably is a flexible body of non-metallic conductive material, such as a conductive plastic. Suitable material must provide acceptable surface and volume resistivity and heat resistance. Polycarbonate film is a suitable material for strip 34, and one such polycarbonate marketed under the trade name BAYFOL® is available from Bayer Polymers Division, Bayer Corporation, 100 Bayer Road, Pittsburgh, Pa. 15205-9741. BAYFOL® as a film is an extruded anti-static film made from a blend of polycarbonate and polyester. Carbon black filler is included in the structure to provide antistatic properties.

Carrier strip 34 is a substantially rectangular, elongated body having lateral edges 36 and 38. Filaments 30 are disposed in electrical contact with carrier strip 34, and project outwardly beyond at least one of lateral edges 36 and 38. Carrier strip 34 is sufficiently flexible in the elongate direction to accommodate various surface irregularities, but has sufficient stiffness in the transverse direction, between lateral edges 36 and 38, to facilitate straight line application on enclosure 10. Straight line application ensures that distal tips 32 of filaments 30 are positioned uniformly with respect to card/memory device 26 inserted in slot 24 along a path indicated by arrow 40, as will be described in more detail hereinafter.

An adhesive, which can be provided on a double-sided acrylic tape 42, bonds securely to filaments 30 and conductive carrier strip 34 on one side and to enclosure 10 on the opposite side. Polyurethane and other adhesive coatings also can be used. Suitable polyurethane for use as an adhesive coating is Minwax® Wipe-On Poly from Minwax Company. Another suitable adhesive is Naycor® 72-9904 acrylic adhesive from National Starch and Chemical Company.

Dissipater 14 is attached to one of the perimeter members of enclosure 10, in operative relation to a pc card or other memory device 26 inserted into slot 24. Enclosures 10 for cards such as PCMCIA cards have very small, thin openings. The tight space requirements can be difficult for arranging static charge dissipation. However, the present invention readily accommodates the limited space requirements of a PCMCIA card slot. To maximize the charge-dissipating effect of anti-static filaments 30, filaments 30 need to have a vertical relationship in reference to the charged surface. Hole or holes 44 in top 16 accommodate filaments 30 without minimizing the effective performance thereof. Dissipater 14 is attached to an outer surface 46 of top 16, and filaments 30 are bent as shown in FIG. 2 to extend through hole or holes 44 an into slot 24. The elasticity of the fibers enable the fibers to have good contact with enclosure 10, with sufficient air space around each filament 30 to promote ionization of air molecules. A layer 48 of highly capacitate material, such as rubber, can be added on top of conductive carrier strip 34 to increase charge holding capacity of dissipater 14. Use of carrier strip 34 material having a degree of rigidity promotes straight-line application of dissipater 14 on enclosure 10. As a result, filaments 30 project equal distances through hole or holes 44, and distal tips 32 are uniformly positioned with respect to card/memory device 26 as it is inserted into slot 34. Filaments 30, and specifically distal tips 32 of filaments 30 can be positioned to contact card/memory device 26, or can be positioned a uniform minimal distance from card/memory device 26.

When card/memory device 26 is inserted into slot 24, if a static charge is present thereon, ionization occurs at distal tips 32 of filaments 30. Depending on the polarity of the charge, negative charges will move toward the filament tips and will be stored in the capacitate material, and the positive charge will move toward the card/memory device 26 that has been charged by an individual through handling. The arrangement thus prevents a spark from taking place when the card/memory device 26 is inserted into slot 24.

The present invention thus does not require an increase in size or thickness of the enclosure 10, with filaments 30 provided on outer surface 46 and projecting through hole or holes 44.

Figure 3:
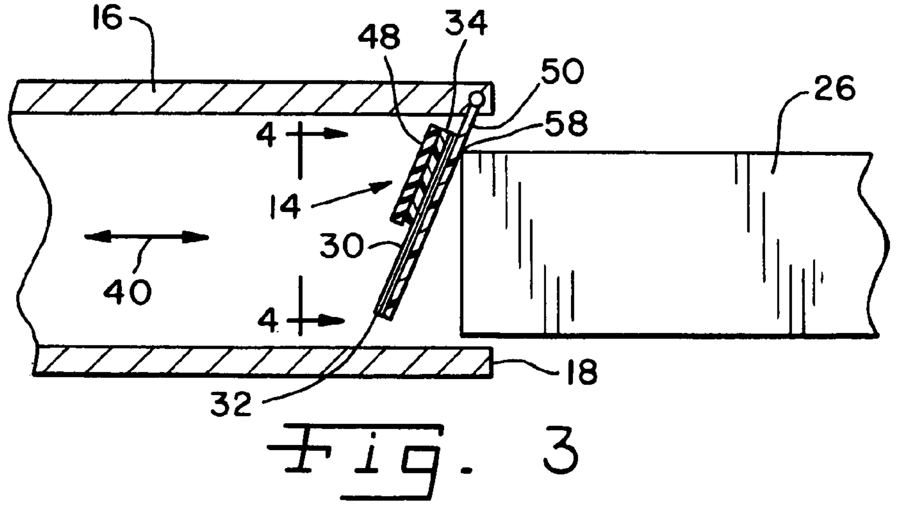
FIG. 3 is a cross sectional view similar to that of FIG. 2, but showing a second embodiment of the invention.
Figure 4:
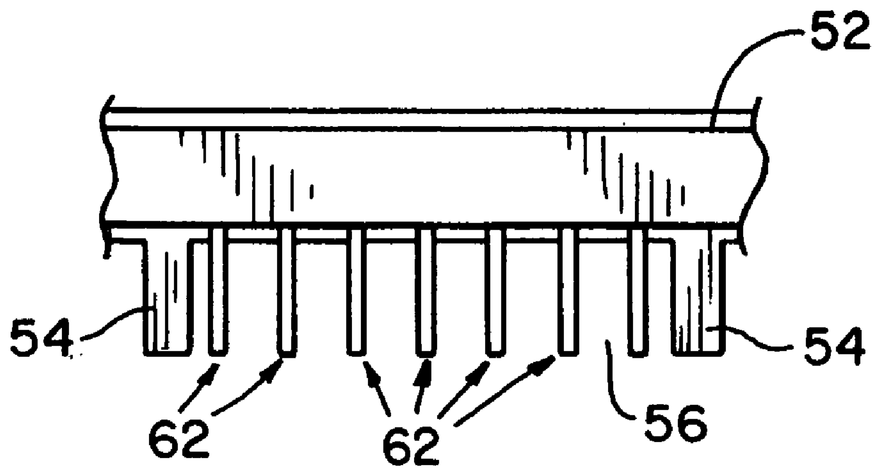
FIG. 4 is a fragmentary end view in the direction of line 4—4 shown in FIG. 3.

FIGS. 3 and 4 illustrate a second embodiment of the present invention that can be applied on a perimeter member of enclosure 10 such as an entrance door 50 or lid. Door 50 can be made of plastic material that is lifted or deflected out of the way as the card/memory device 26 is inserted into slot 24. Dissipater 14 is attached on an inner surface 52 of door 50. Door 50 includes one or more fingers 54 in spaced relation, two fingers 54 being shown in FIG. 4. An open area or areas 56 are provided adjacent fingers 54. Filaments 30 are provided in open area 56, between fingers 54, slightly inwardly in slot 24 from fingers 54. Fingers 54 are engaged by a leading edge 58 of card/memory device 26 when card/memory device is inserted into slot 24. Thus, card/memory device 26 contacts primarily only fingers 54 as it is inserted into slot 24, and filaments 30 are protected during the insertion of card/memory device 26. If unprotected, filaments 30 could be damaged by shear force applied thereagainst as card/memory device 26 is inserted. With filaments 30 protected by the relative positions of fingers 54, repeated insertion and withdrawal of cards/memory devices 26 does not damage individual filaments 30.

Figure 5:
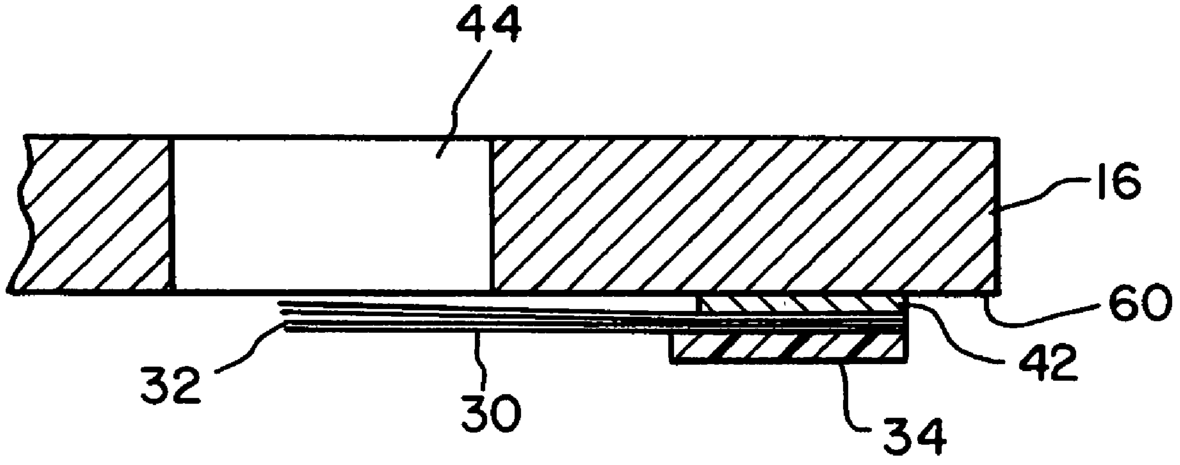
FIG. 5 is a cross sectional view similar to that of FIGS. 2 and 3, but illustrating yet another embodiment of the present invention.

FIG. 5 illustrates yet another embodiment of the present invention in which dissipater 14 is attached along an inner surface 60 of a perimeter member of enclosure 10. As illustrated, inner surface 60 is provided on top 16, but could be provided equally well on bottom 18 in particular configurations. The structure of dissipater 14 is the same as that shown in the first and second embodiments. However, instead of extending through holes or slots to the inside of enclosure 10 as in the first embodiment, or being located in an open area of the enclosure structure as in the second embodiment, filaments 30 simply extend along inner surface 60, in uniform position relative to card/memory device 26 inserted in slot 24. To provide sufficient air space for ionization around each filament 30, hole or holes 44 remain near distal tips 32. Again, a low profile is provided for the entire structure of enclosure 10.

Filaments 30 in the various embodiments can be provided in a substantially continuous, brush-like arrangement. Filaments 30 also can be provided in a plurality of adjacent bundles 62 (FIG. 4), with each bundle 62 including many individual filaments 30. Filaments 30, or bundles 62 of filaments 30 extend substantially from side to side of slot 24, transverse to the insertion path indicated by arrow 40.

The present invention provides an effective, slim structure for dissipation of static charges on PCMCIA cards or other cards or memory devices. Potential damage to the device in which card/memory device 26 is applied is thereby substantially reduced.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. An electronic interface component, comprising:

a slot configured for receiving a second interface component therein, said slot including at least one perimeter member;

a static charge dissipater attached to said perimeter member, said dissipater including:

a conductive carrier strip;

a plurality of electrically conductive filaments electrically connected to said conductive carrier strip, said filaments having distal tips in spaced relation to said conductive carrier strip; and an adhesive for connecting said strip and said filaments to said perimeter member; and said dissipater positioned on said perimeter member with said filament distal tips in substantially uniform position relative to a said second interface component inserted into said slot.

2. The interface component of claim 1, said carrier strip disposed on an outside surface of said perimeter member, said perimeter member including a hole, and said filaments extending through said hole into said slot.

3. The interface component of claim 1, said static charge dissipater disposed on an inside surface of said perimeter member, and said perimeter member defining a hole therethrough near said distal tips of said filaments.

4. The interface component of claim 1, said perimeter member comprising a pivoting door to said slot.

5. The interface component of claim 4, said door including a plurality of spaced fingers, and filaments of said static charge dissipater disposed in said slot behind said fingers.

6. The interface component of claim 1, said slot being a card slot.

7. The interface component of claim 1, said filaments selected from the group consisting of fibers of carbon, stainless steel and conductive acrylics.

8. The interface component of claim 1, said carrier strip being plastic.

9. The interface component of claim 1, said carrier strip being polycarbonate.

10. The interface component of claim 1, said filaments grouped in bundles.

11. The interface component of claim 1, including a layer of capacitate material on said carrier strip.

12. The interface component of claim 11, said capacitate material being rubber.

13. A static charge dissipating assembly for an electronic component card slot, said static charge dissipating assembly comprising:

at least one perimeter member defining said card slot for receiving a card inserted therein in an insertion direction; and a static control device attached to said perimeter member, said static control device including;

a conductive plastic carrier strip, said carrier strip having a length and first and second lateral edges, said carrier strip disposed transverse to said insertion direction; and a plurality of electrically conductive filaments attached to said carrier strip, said plurality of filaments disposed on said strip transverse to said lateral edges, and extending beyond at least one of said lateral edges, said filaments having diameters sufficiently small to induce ionization in the presence of an electrical field, and having distal ends remote from said carrier strip disposed in said slot.

14. The static charge dissipating assembly of claim 13, said carrier strip disposed on an outside surface of said perimeter member, said perimeter member including a hole, and said filaments extending through said hole into said slot.

15. The static charge dissipating assembly of claim 13, said static charge dissipater disposed on an inside surface of said perimeter member, and said perimeter member defining a hole therethrough near said distal tips of said filaments.

16. The static charge dissipating assembly of claim 13, said perimeter member comprising a pivoting door to said slot.

17. The static charge dissipating assembly of claim 16, said door including fingers, and said filaments disposed in said slot behind said fingers.

18. The static charge dissipating assembly of claim 13, including a layer of capacitate material on said carrier strip.

19. The static charge dissipating assembly of claim 18, said capacitate material being rubber.

20. A method for dissipating static charge on a card inserted into a card slot of an electronic device, said method comprising steps of:

providing a path for inserting the card in to the slot, and an arrangement of filaments having diameters sufficiently small to induce ionization in the presence of an electrical field;

positioning distal ends of the filaments in the path;

passing the card along the path adjacent the distal tips of the filaments; and inducing ionization from the static electric charge on the card passing along the filament distal tips.

* * * * *